United States Patent [19]
Capaul

[11] Patent Number: 5,782,551
[45] Date of Patent: Jul. 21, 1998

[54] ACOUSTICAL LIGHTING FIXTURE

[76] Inventor: Raymond W. Capaul. Box 643 Wildwood Dr., Aurora, Ill. 60506

[21] Appl. No.: 588,910

[22] Filed: Jan. 19, 1996

Related U.S. Application Data

[63] Continuation of Ser. No. 332,955, Nov. 1, 1994, abandoned.

[51] Int. Cl.$^6$ ............................................. F21S 1/02
[52] U.S. Cl. ........................ 362/148; 362/364; 52/144; 52/506.06
[58] Field of Search ........................ 362/147, 148, 362/364, 365, 366; 181/290, 291, 295, 284, 286; 52/144, 145, 506.06, 407.3, 28

[56] References Cited

U.S. PATENT DOCUMENTS

| | | | |
|---|---|---|---|
| 2,680,805 | 6/1954 | MacDonald | 362/148 |
| 2,710,335 | 6/1955 | Wong | 362/148 |
| 2,935,151 | 5/1960 | Watters et al. | 52/145 |
| 3,049,204 | 8/1962 | Sorenson | 52/145 |
| 3,094,285 | 6/1963 | Kruger | 52/506.06 |
| 3,321,877 | 5/1967 | Alexieff | 52/28 |
| 3,744,396 | 7/1973 | Raider | 362/364 X |
| 3,922,073 | 11/1975 | Schwartz | 362/148 X |
| 4,175,360 | 11/1979 | Mulvey | 362/148 X |
| 4,200,903 | 4/1980 | Koenig et al. | 362/134 |
| 4,428,454 | 1/1984 | Capaul . | |
| 4,807,411 | 2/1989 | Capaul . | |
| 5,174,849 | 12/1992 | Capaul . | |
| 5,202,174 | 4/1993 | Capaul | 52/145 |
| 5,287,668 | 2/1994 | Dall et al. . | |

OTHER PUBLICATIONS

The Harrington and King Perforating Co., Inc. General Catalog No. 75, pp. 54, 55, dated 1963.
Metalux Product Catalog, p. 74, dated 1994.
Acoustical Materials Association Bulletin No. XXIII, pp. 42, 43, dated 1963.
Remm Associates, Inc. Acousti–Flex product literature, 4 pages, dated 1963.

*Primary Examiner*—Thomas M. Sember
*Attorney, Agent, or Firm*—Wallenstein & Wagner, Ltd

[57] ABSTRACT

The present invention provides an improved lighting fixture 10. The lighting fixture 10 is an acoustical lighting fixture which may be suspended below a deck 14. The lighting fixture 10 can be suspended below the deck by placing the fixture on a T-bar grid 16 of a drop ceiling 12. The acoustical lighting fixture 10 includes an acoustical shell 30 having an electrical light source 32, such as a fluorescent tube, removably mounted on the acoustical shell 30. The acoustical shell 30 may be constructed from a fiberglass material or a perforated metal material. The acoustical lighting fixture 10 also includes an acoustical, sound absorbing blanket 26 that absorbs sounds that strike the acoustical lighting fixture 10.

The acoustical lighting fixture 10 may also include a louver 28 which encloses the electrical light source 32 within the acoustical shell 30. Additionally, the lighting fixture 10 may include a electrical plug 55 that can be inserted into an outlet 57 that is electrically connected to an electrical power supply 22.

33 Claims, 2 Drawing Sheets

ACOUSTICAL LIGHTING FIXTURE

This is a continuation of application Ser. No. 08/332,955, filed on Nov. 1, 1994, now abandoned.

FIELD OF THE INVENTION

The present invention relates generally to lighting systems. More specifically, the present invention relates to acoustical lighting fixtures which are suspended from a ceiling or deck and absorb sound.

BACKGROUND OF THE INVENTION

A significant consideration in the design of modern offices is the interaction between people and the office environment. As such, an objective of office space design is to provide a working environment that is ergonomically friendly to the working personnel. Office space lighting is one factor that is considered in designing the office space. Another factor in office space design is the amount of sound or noise in the office space.

Electrical lighting fixtures are commonly installed inside buildings to provide light. Office buildings generally have lighting fixtures, such as fluorescent lights, installed in the ceilings above work areas.

Usually, a person generates sounds or noises when engaging in activities within a workstation. The sounds may be generated from talking on a telephone, typing on a computer, opening and closing desk drawers or file cabinets, or simply shuffling papers or files, for example. These sounds may be distracting, annoying, and result in decreased employee productivity.

Many office space work areas are open plan work areas having multiple workstations adjacent to each other. Although it is desirable to reduce overall sound or noise levels in the work area, sound or noise may easily travel from one workstation to other workstations.

The open plan workstations may have partitions separating the workstations from each other to reduce noise levels and provide privacy. The partitions may reduce the amount of sound that travels from one workstation to another. Frequently, the partitions extend above the floor a distance that is less than the height of the ceiling. Accordingly, sound from a workstation may easily travel over the partitions by traveling upward to the ceiling, bouncing off the ceiling and the ceiling lighting fixtures, and traveling downward into other workstations. Even if the partitions extend from the floor to the ceiling, sound may bounce off of the ceiling and the ceiling lighting fixtures and travel downward into the same workstation.

Office ceilings have been designed to reduce the amount of sound and noise that is reflected or bounced off of the ceiling. For example, the ceiling may be a drop ceiling that is suspended below a deck. The drop ceiling commonly includes acoustical ceiling panels that reduce the amount of sound reflected from the panels. When drop ceilings are installed, the ceiling lighting fixtures are also suspended below the deck, usually, at approximately the same height as the drop ceiling panels. Although acoustical ceiling panels may reduce sound levels, sound may still reflect or bounce off of the lighting fixtures in the ceiling.

Prior ceiling lighting fixtures have been "hard wired" to an electrical supply source. Accordingly, an electrician is required to install the lighting fixture and complete the electrical connections. An electrician is also required to disconnect the electrical connections and remove the lighting fixture.

Therefore, a need exists to improve lighting fixtures, and more specifically, ceiling lighting fixtures. There is a need to reduce noise levels in an office environment by reducing or preventing noise from reflecting off of ceiling lighting fixtures. The present invention satisfies this need and improves lighting fixtures by providing lighting fixtures that absorb sounds and noises. The present invention also satisfies a need to improve the ease of installation and removal of drop ceiling lighting fixtures. Accordingly, one advantage of the present invention is to improve lighting fixtures.

Another advantage of the present invention is to provide lighting fixtures that absorb sound.

Another advantage of the present invention is to improve working environments by reducing the noise level.

Another advantage of the present invention is to provide ceiling lighting fixtures that are easily installed in and removed from a drop ceiling.

Another advantage of the present invention is to provide an easily maintained lighting fixture.

Another advantage of the present invention is to provide a low cost lighting fixture.

Other advantages and aspects of the present invention will become apparent after reading this disclosure and reviewing the accompanying drawings.

SUMMARY OF THE INVENTION

The present invention provides an improved lighting fixture. The lighting fixture is an acoustical lighting fixture which may be suspended below a deck. The lighting fixture can be suspended below the deck by placing the fixture on a T-bar grid of a drop ceiling. The acoustical lighting fixture includes an acoustical shell having an electrical light source, such as a fluorescent tube, removably mounted on the acoustical shell. The acoustical shell may be constructed from a molded fiberglass material or a perforated metal stamping. The acoustical lighting fixture also includes an acoustical, sound absorbing blanket that absorbs sounds that strike the acoustical lighting fixture.

The acoustical lighting fixture may also include a louver which encloses the electrical light source within the acoustical shell. Additionally, the lighting fixture may include a electrical plug that can be inserted into an outlet that is electrically connected to an electrical power supply.

DETAILED DESCRIPTION OF PREFERRED EMBODIMENTS

Although the present invention can be made in many different forms, the preferred embodiments are described in this disclosure and shown in the attached drawings. This disclosure exemplifies the principles of the present invention and does not limit the broad aspects of the invention only to the illustrated embodiments.

Figure 1:
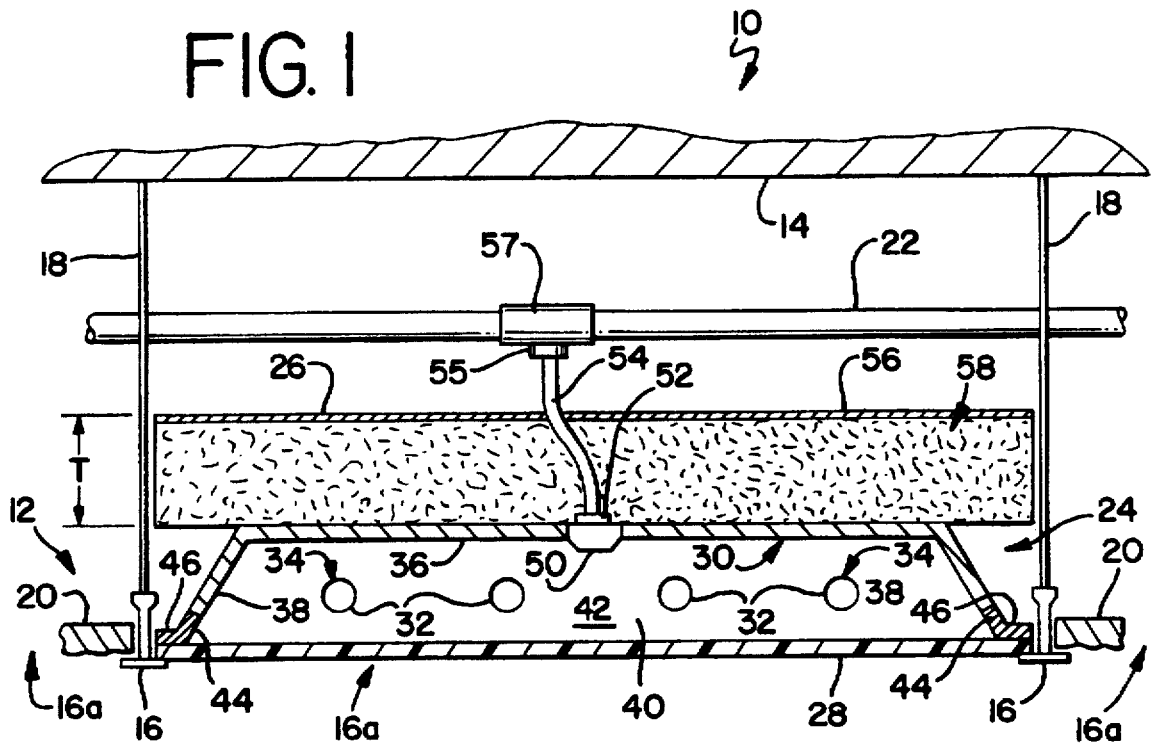
FIG. 1 is a cross-sectional view of an acoustical lighting fixture made in accordance with the principles of the present invention.

FIG. 1 shows a cross-sectional view of a first embodiment of an acoustical lighting fixture 10 made in accordance with the principles of the present invention. The acoustical lighting fixture 10 is shown installed in a drop ceiling 12 that is suspended from a structural ceiling or deck 14. The drop ceiling 12 includes a T-bar grid 16 suspended below the deck 14 by support lines 18 to provide a grid of openings 16a. The T-bar grid openings 16a are typically rectangular; but, they may have other shapes. Acoustical drop ceiling panels 20 are positioned in the T-bar grid 16 by being laid on top of the T-bar grid 16 in the openings 16a. An electrical supply 22 is provided to supply electricity to the acoustical lighting fixture 10.

Figure 2:
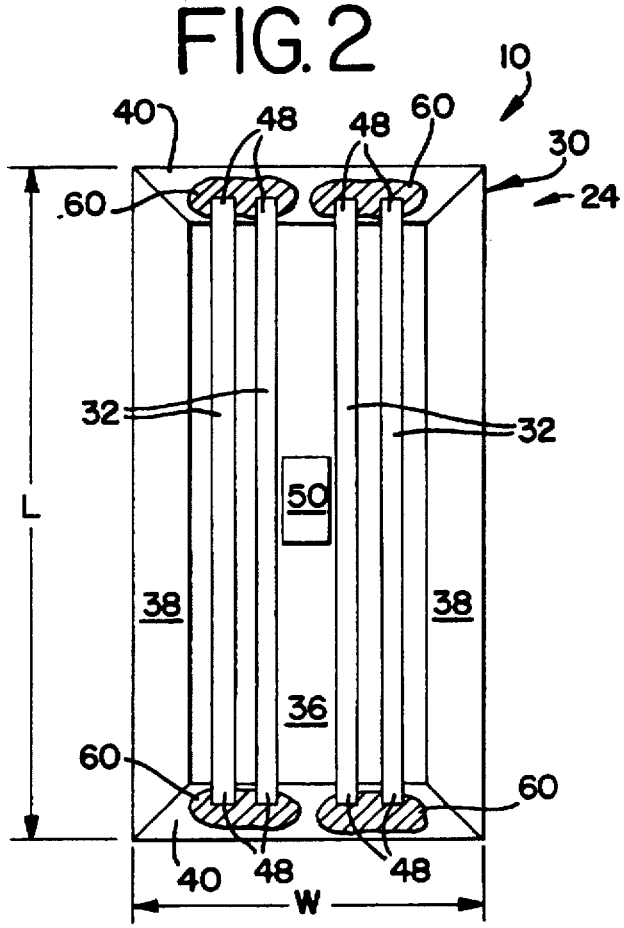
FIG. 2 is a bottom view of the acoustical lighting fixture of FIG. 1.
Figure 3:
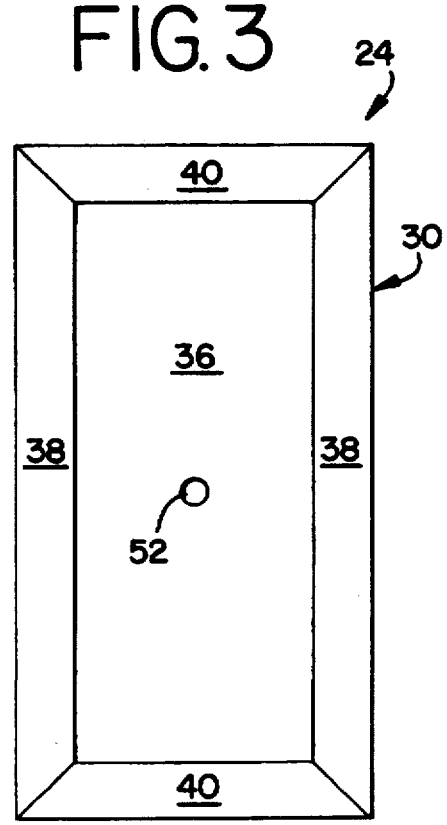
FIG. 3 is a top view of an acoustical shell of the acoustical lighting fixture of FIG. 1.

FIG. 2 shows a bottom view of the acoustical lighting fixture 10 of FIG. 1, and FIG. 3 shows a top view of an acoustical shell 30 of the lighting fixture 10. The acoustical lighting fixture 10 is generally rectangular in shape; although, the acoustical lighting fixture 10 may be made in other shapes such as square for example. The rectangular shape of the acoustical lighting fixture 10 corresponds to the shape of the T-bar grid openings 16a and defines a length L and a width W of the lighting fixture 10. The length L and the width W define a lighting fixture area. A few sizes of acoustical lighting fixtures 10 are 2 ft.×2 ft., 30 inches×30 inches, and 2 ft.×4 ft.

Referring to FIG. 1, the acoustical lighting fixture 10 includes a shell assembly 24 and an acoustical blanket 26. The lighting fixture 10 may also include a louver 28. The shell assembly 24 includes an acoustical shell 30, an electrical light source 32, and an electrical connection 34. Referring to FIGS. 1, 2 and 3, the acoustical shell or shroud 30 includes a substantially horizontal top 36 that is substantially parallel to the deck 14. A pair of opposed, inclined sides 38 extend downward and outward from the top 36. A pair of opposed, inclined ends 40 also extend downward and outward from the top 36. Each one of the ends 40 is connected to both of the sides 38 to form a recessed area 42 within the acoustical lighting fixture 10. Only one of the ends 40 is shown in the cross sectional view of FIG. 1; while both of the ends 40 are shown in FIGS. 2 and 3. Referring back to FIG. 1, the sides 38 and the ends 40 have an edge 44 that circumscribes the acoustical shell 30. The edge 44 may have an extended portion 46 that circumscribes the edge 44. The extended portion 46 is substantially flat and horizontal, and protrudes outward from the acoustical shell 30. The function of the edge 44 is described below.

The acoustical shell 30 is preferably constructed from a fiberglass material that can be molded into the desired shell shape. A resin may be added to the fiberglass material to harden selected portions of the shell 30 or the entire shell 30. The resin hardened portions are protected from damage and provide stronger locations for mounting fixture components. One particular portion of the shell 30 that is resin hardened is the edge 44; the purpose for resin hardening the edge 44 is described below. The resin is applied to the outside of the shell 30 at the desired locations and then the resin treated locations are properly cured. For example, the resin treated areas can be heat treated, air dried or dried in an infra-red oven depending on the type of resin. Various fiberglass hardening resins could be used, for example, polyester, phenolic, or silicone resins. Preferably, the shell 30 is constructed from a fiberglass material having a relatively high density as compared to the density of the acoustical blanket 26. For example, the fiberglass shell 30 may have a density of from about 16 lbs. per cubic foot to about 20 lbs. per cubic foot; while, the acoustical blanket 26 may have a density of from about 0.50 lbs. per cubic foot to about 1.50 lbs. per cubic foot.

The electrical light source 32 is removably mounted on the acoustical shell 30 to the electrical connection 34. As shown in FIGS. 1 and 2, the electrical light source 32 is a plurality of fluorescent light tubes. Alternatively, the electrical light source 32 may be any suitable light bulb or lamp, for example, a mazda lamp, a plain light bulb, a silver bowl light bulb, or an energy saving light bulb. The fluorescent light tubes 32 are removably mounted within the recessed area 42 of the acoustical shell 30. Specifically, the opposed ends 48 of the fluorescent tubes 32 are mounted on the opposed ends 40 of the acoustical shell 30 such that the fluorescent tubes 32 extend across the length L of the acoustical shell 30.

The electrical connections 34, and thus, the fluorescent light tubes 32 are electrically connected to a ballast or transformer 50 which is mounted on the top 36 of the acoustical shell 30. Conventional lighting fixture wiring (not shown) can be utilized to electrically connect the connections 34 to the ballast 50. The ballast 50 regulates the electrical current flowing to the fluorescent light tubes 32 to provide a proper voltage and a stable electrical current. The ballast 50 has an electrical connection 52 for connection to the electrical feeder 54. The electrical feeder 54 has a plug 55 for electrical connection to an outlet 57 on the electrical supply 22. The ballast 50 and feeder 54 connection 52 may also be a plug or the connection 52 may be pre-assembled during manufacture of the acoustical lighting fixture 10.

The acoustical blanket 26 is provided with the acoustical lighting fixture 10 to absorb sound and noise. The acoustical blanket 26 is laid on top of and supported by the acoustical shell 30. In this position the acoustical blanket 26 is placed between the deck 14 and the acoustical shell 30. As described above, the acoustical lighting fixture 10 has a length L and a width W that defines the lighting fixture area. The acoustical blanket 26 has a corresponding length L and width W such that the acoustical blanket 26 covers substantially the entire lighting fixture area. The acoustical blanket 26 also has a thickness T. The acoustical blanket thickness T and the density can be varied to provide an acoustical blanket 26 that absorbs a desired amount of sound. The acoustical blanket 26 can be sized to absorb essentially 100% of the sound that strikes or contacts the acoustical lighting fixture 10. For example, acoustical lighting fixtures made according to the principles of the present invention have been found to have noise reduction coefficients (N.R.C.) of 0.30 N.R.C. to 1.00 N.R.C. The noise reduction coefficients were determined by using the industry standard noise reduction coefficient reverberation room test by averaging the N.R.C. measurements at 250 hertz, 500 hertz, 1000 hertz and 2000 hertz. Accordingly, the acoustical lighting fixture 10 can absorb 100% of the sound that strikes the lighting fixture 10.

Sound absorption can be measured in Sabins where one Sabin equals one square foot of material that absorbs 100% of the sound that strikes the material (i.e. 1.00 N.R.C.). When planning office space, the acoustical benefit of the 100% sound absorbing acoustical lighting fixture 10 can be easily calculated. The total number of acoustical lighting fixtures 10 installed in the office space is multiplied by the area of one fixture 10. This determines the total Sabins provided by the acoustical lighting fixtures 10. For example, 25 acoustical lighting fixtures 10 that have a width W of 2 ft. and a length L of 4 ft. provide 200 Sabins of sound absorption.

The acoustical blanket 26 is constructed from a fiberglass material. Preferably, the blanket 26 is constructed from a fiberglass material having a relatively low density as compared to the density of the acoustical shell 30. For example, the fiberglass blanket may have a density of from about 0.50 lbs. per cubic foot to about 1.50 lbs. per cubic foot. Owens Corning Fiberglass Corp., Toledo, Ohio, provides such fiberglass material. The acoustical blanket 26 absorbs sound by dissipating sound wave energy. As sound waves strike the acoustical blanket 26, the sound waves vibrate the fiberglass fibers by transferring the sound wave energy to the fibers. In this manner, the acoustical blanket 26 absorbs sounds. By increasing the thickness T of an acoustical blanket 26 having a particular length L and width W, the amount of fibers available for vibration are increased and the greater the amount of sound wave energy the blanket 26 can absorb.

The acoustical blanket 26 also has a foil backing 56 attached to a side 58 of the blanket 26 that faces the deck 14. Any sound that strikes the foil backing 56 reflects off of the foil backing 56 rather than passing through the foil backing 56. As sound waves strike the acoustical blanket 26, some sound waves may pass through the blanket 26 and reflect off of the foil backing 56. The reflected sound waves travel back into the acoustical blanket 26, strike and vibrate the fiberglass fibers, and are absorbed by the blanket 26.

Some office environments have speakers that emit background noise which is commonly termed "white noise." These speakers may be placed in the space between the deck 14 and the drop ceiling 12. Sound from these speakers will strike the foil backing 56 on the acoustical blanket 26 and reflect off of the foil backing 56 without being absorbed by the acoustical blanket 26. Thus, the foil backing 56 also serves to evenly distribute white noise throughout the plenum space and reduces the number of speakers required by approximately 50%.

The acoustical lighting fixture 10 is shown in FIG. 1 with a louver 28. The louver 28 is generally rectangular in shape and extends over the area of the lighting fixture 10. Of course, if the lighting fixture 10 has a square shape then the louver 28 would also have a square shape. The louver 28 is supported by the T-bar grid 16 around the circumference of the louver 28. The acoustical shell 30, specifically the edge 44 of the acoustical shell 30, rests on the louver 28. The louver 28 may be removably fastened to the acoustical shell 30 by a conventional fastener (not shown). Accordingly, the louver 28 encloses the electrical light source 32 within the recessed area 42 of the acoustical shell 30. Metal, plastic or wire materials, for example, can be used to construct the louver 28. The function of the louver 28 is to obstruct the view of the light source 32 and the electrical components, and to control or direct the light emitting from the acoustical lighting fixture 10.

FIG. 2 shows a bottom view of the acoustical lighting fixture 10 of FIG. 1 with the louver 28 removed. FIG. 2 shows additional portions 60 of the fiberglass acoustical shell 30 that are resin hardened. The resin hardened portions 60 are the locations where the fluorescent tubes 32 are mounted on the ends 40 of the shell 30. The resin hardened portions 60 provide increased support for mounting the fluorescent tubes 32 on the shell 30. Of course, additional portions of the shell 30 may also be resin hardened if desired. To simplify the manufacturing process of the shell 30, mold inserts can be added to the mold to define the locations 60 on the shell 30 that will be resin hardened. The molded locations make it easier to locate the areas to be resin hardened.

Figure 4:
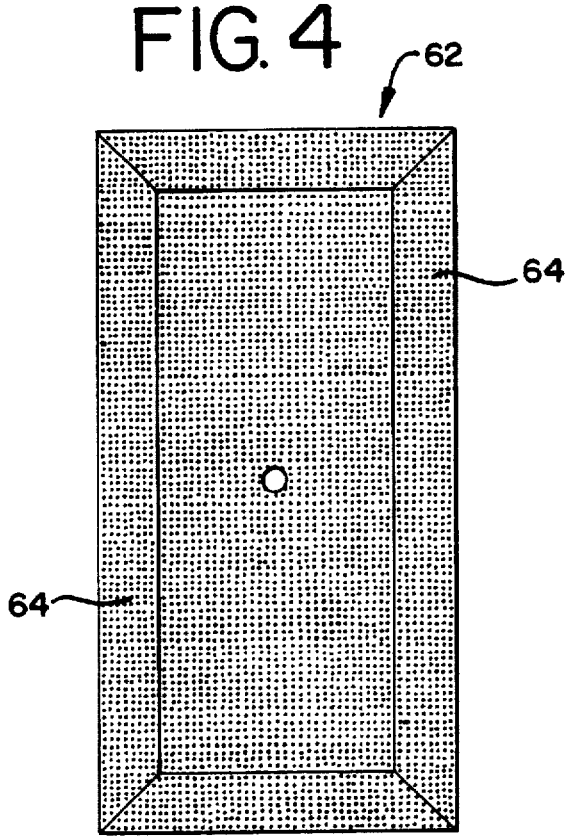
FIG. 4 is top view of another acoustical shell made in accordance with the principles of the present invention.
Figure 4A:
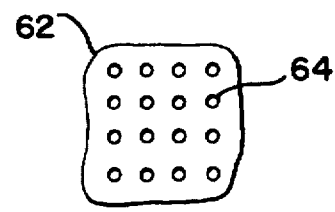
FIG. 4A is an enlarged view of a portion of the acoustical shell of FIG. 4.

FIG. 4 shows a top view of another acoustical shell 62 made in accordance with the principles of the present invention and FIG. 4A shows an enlarged portion of the acoustical shell 62 of FIG. 4. The acoustical shell 62 is constructed from a metal material that has perforations or holes 64 through the material. The number and size of perforations 64 should collectively provide approximately 5% to 20% open area through the acoustical shell 62. For example, the shell 62 may have a sufficient number of 1/16 inch diameter holes 64 to provide 5% to 20% open area through the shell 62. The Harrington & King Perforating Co., Inc., Chicago, Ill., provides perforated metal stamping material suitable for making an acoustical shell 62. For example, one suitable material is a 3/32" straight material. The 3/32" straight material has 0.0941" diameter holes spaced apart on 3/16" centers in a straight pattern. The material has 25 holes per square inch and 19.6% open area.

Figure 5:
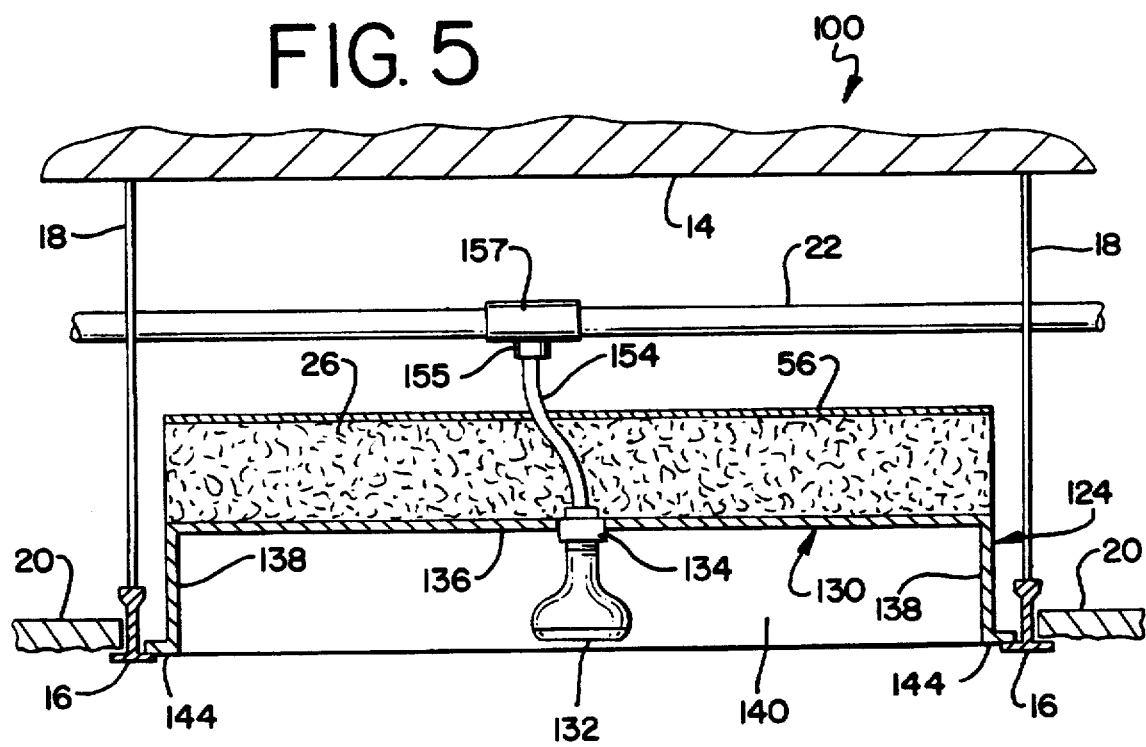
FIG. 5 is a cross-sectional view of another acoustical lighting fixture made in accordance with the principles of the present invention.

FIG. 5 shows a cross-sectional view of another acoustical lighting fixture 100 made in accordance with the principles of the present invention. The acoustical lighting fixture 100 comprises a shell assembly 124 and an acoustical blanket 26 on top of the shell assembly 124. The acoustical lighting fixture 100 is shown without a louver; although, the lighting fixture 100 may include a louver 28 as described above. Without the louver, the acoustical lighting fixture 100 is suspended from the deck 14 by the T-bar grid 16 supporting an edge 144 of a shell 130 of the shell assembly 124. The T-bar grid 16 supports the edge 144 around the circumference of the shell 130. The acoustical blanket 26 is the same blanket as described above including the foil backing 56.

The shell assembly 124 includes an acoustical shell 130 having a pair of sides 138 and a pair of ends 140. Only one end 140 is shown in the cross-sectional view of FIG. 5. The sides 138 and the ends 140 extend vertically downward from a top 136 of the acoustical shell 130. The sides 138 and the ends 140 have a resin hardened edge 144 as described in regards to the acoustical shell 30 of FIG. 1.

The acoustical lighting fixture 100 is shown with an electrical light source 132 being a standard plain type light bulb rather than a fluorescent tube. A light bulb socket 134 is mounted on the top 136 of the acoustical shell 130 to hold the light bulb 132 and to electrically connect the light bulb 132 to the electrical supply 22. The electrical feeder 154 is "hard wired" to the light bulb socket 134 using standard electrical connection techniques. An electrical plug 155 is provided on the feeder 154 for electrical connection to an outlet 157 provided on the electrical supply 22.

Referring to FIG. 1, in operation of the present invention the drop ceiling T-bar grid 16, or other suitable support, and the electrical supply 22 are installed. The assembled acoustical lighting fixture 10 is installed by lifting it up to the T-bar grid 16 and positioning it such that the louver 28 or the edge 44 of the acoustical shell 30 rests on the T-bar grid 16. The acoustical lighting fixture 10 is connected to the electrical supply 22 by inserting the plug 55 into the outlet 57. The installer of the acoustical lighting fixture 10 can access the plug 55 through the openings 16a in the T-bar grid 16 adjacent the lighting fixture 10. Alternatively, the plug 55 could be inserted into the outlet 57 prior to positioning the lighting fixture 10 on the T-bar grid 16. The acoustical lighting fixture 10 can be easily removed by reversing the installation procedure.

As sounds or noises are generated below the acoustical lighting fixture 10, the sounds will travel upward and strike the lighting fixture 10. The sounds will pass through the acoustical shell by traveling through the fiberglass shell 30 or traveling through the perforations 64 in the metal shell 62. The sounds then strike the fiberglass acoustical blanket 26 and are absorbed by the blanket 26. Conversely, sound or white noise that is generated above the acoustical lighting fixture 10 may travel downward, reflect off of the foil backing 56 and distribute evenly throughout the plenum space.

While the preferred embodiments have been illustrated and described, numerous changes and modifications can be made without significantly departing from the spirit and scope of this invention. Therefore, the inventors intend that such changes and modifications be covered by the appended claims.

What is claimed is:

1. A lighting fixture comprising:
   an acoustical shell adapted to receive an electrical light source and adapted to be removable at a ceiling location, and to absorb a first portion of sound energy impinging on the acoustical shell and to permit a second portion of sound energy to pass therethrough; and,
   an acoustical blanket mounted on the acoustical shell and installable with the acoustical shell, the acoustical blanket adapted to absorb at least a portion of the second portion of sound energy.

2. The lighting fixture of claim 1 wherein the lighting fixture is suspended below a deck.

3. The lighting fixture of claim 2 wherein the acoustical blanket is positioned between the acoustical shell and the deck.

4. The lighting fixture of claim 1 further comprising a louver which encloses the electrical light source within the acoustical shell.

5. The lighting fixture of claim 1 wherein the electrical light source is selected from the group consisting of fluorescent tube, mazda lamp, silver bowl, and energy saving light bulb.

6. The lighting fixture of claim 1 wherein the lighting fixture absorbs substantially all normal room sound energy impinging on the lighting fixture.

7. The lighting fixture of claim 1 wherein the acoustical shell comprises:
   a substantially horizontal top;
   a pair of opposed sides extending downward from the top; and,
   a pair of opposed ends extending downward from the top, each end connecting the sides to each other.

8. The lighting fixture of claim 7 wherein the light source is mounted on the top.

9. The lighting fixture of claim 7 wherein the light source is mounted on the ends.

10. The lighting fixture of claim 7 wherein the sides of the shell extend downward and outward at an angle from the top.

11. The lighting fixture of claim 7 wherein the sides and the ends extend substantially vertically downward from the top.

12. The lighting fixture of claim 1 wherein the acoustical shell is formed from a fiberglass material of a desired density to permit the second portion of sound energy to pass therethrough, the fiberglass material being of sufficient rigidity to hold the form of the acoustical shell.

13. The lighting fixture of claim 12 wherein the acoustical shell is resin hardened at a location where the acoustical shell receives the light source.

14. The lighting fixture of claim 12 wherein the lighting fixture is adapted to be suspended below a deck by a support.

15. The lighting fixture of claim 1 wherein the acoustical shell is constructed from metal having perforations for permitting the second portion of sound energy to pass therethrough.

16. The lighting fixture of claim 15 wherein an open area of the perforations constitutes an area of 5% to 25% of a total area of the acoustical shell.

17. The lighting fixture of claim 1 wherein the acoustical blanket has first and second opposed sides, the second side contacting the acoustical shell, and further comprising a foil backing attached to the first side of the acoustical blanket.

18. The lighting fixture of claim 1 wherein the acoustical shell has a high material density relative to a material density of the acoustical blanket.

19. The lighting fixture of claim 18 wherein the acoustical shell has a material density of from about 16 lbs. per cubic foot to about 20 lbs. per cubic foot and the acoustical blanket has a material density of from about 0.50 lbs. per cubic foot to about 1.50 lbs. per cubic foot.

20. An acoustical lighting system for lighting a workspace below a deck having an electrical power supply comprising:
   an acoustical shell having a top portion and a shroud portion depending from the top portion, the acoustical shell adapted to absorb a first portion of sound energy impinging on the acoustical shell and to permit a second portion of sound energy to pass therethrough, and adapted to receive a light source for communication with the power supply;
   means for suspending the acoustical shell below the deck; and,
   a sound absorbing layer mounted to the top portion between the deck and the acoustical shell and adapted to absorb at least a portion of the second portion of sound energy.

21. The lighting system of claim 20 wherein the means for suspending comprises a drop ceiling T-bar grid.

22. The lighting system of claim 20 wherein the light source is electrically connected to a plug adapted for insertion into an outlet connected to the electrical supply.

23. A method of reducing sound reflection from a lighting fixture comprising the steps of:
   exposing a shell constructed of sound absorbing material to a first portion of sound energy impinging on the shell and permitting a second portion of sound energy to pass therethrough;
   exposing a layer of sound absorbing material to the second portion of sound energy, the layer installable with the shell; and,
   installing the lighting fixture to a ceiling location.

24. The method of claim 23 wherein the shell is formed from a fiberglass material.

25. The method of claim 23 wherein the shell is formed from a perforated metal.

26. A lighting fixture comprising:
   a fiberglass shell adapted to receive an electrical light source and adapted to be removable at a ceiling location, and to absorb a first portion of sound energy impinging on the acoustical shell and to permit a second portion of sound energy to pass therethrough; and,
   an acoustical blanket mounted on the acoustical shell and installable with the acoustical shell, the acoustical blanket adapted to absorb at least a portion of the second portion of sound energy.

27. The lighting fixture of claim 26 wherein the acoustical shell is constructed from a molded fiberglass material.

28. The lighting fixture of claim 26 wherein the lighting fixture has a noise reduction coefficient of about 0.030 N.R.C to about 1.00 N.R.C.

29. A lighting fixture comprising:

an acoustical shell having multiple perforations and at least one light source mounting location, the shell adapted for mounting to a ceiling location, and adapted to absorb a first portion of sound energy impinging on the shell and to permit a second portion of sound energy to pass therethrough;

the shell adapted to receive an electrical light source removably mounted on the shell at the light source mounting location, the electrical light source being adapted for electrical connection to an electrical power source; and, an acoustical blanket mounted on the shell and installable with the shell, the blanket adapted to absorb at least a portion of the second portion of sound energy.

30. The lighting fixture of claim 29 wherein an open area of the perforations constitutes an area of 5% to 25% of a total area of the shell.

31. The lighting fixture of claim 29 wherein the lighting fixture has a noise reduction coefficient of about 0.030 N.R.C to about 1.00 N.R.C.

32. A lighting fixture comprising:

an acoustical shell having at least one light source mounting location and adapted to absorb a first portion of sound energy impinging on the acoustical shell and to permit a second portion of sound energy to Pass therethrough;

the acoustical shell adapted to receive an electrical light source removably mounted on the acoustical shell at the light source mounting location, the electrical light source being adapted for electrical connection to an electrical power source;

the acoustical shell capable of being placed into contact with a louver positioned below the light source such that the light source is enclosed by the acoustical shell and the louver; and, an acoustical blanket mounted on the acoustical shell and installable with the acoustical shell, the acoustical blanket adapted to absorb at least a portion of the second portion of sound energy.

33. A lighting fixture comprising:

an acoustical shell having a top and downward extending sides and ends which form a recessed area within the acoustical shell, the acoustical shell having multiple light source mounting locations within the recessed area and adapted to absorb a first portion of sound energy impinging on the acoustical shell and to permit a second portion of sound energy to pass therethrough;

the acoustical shell adapted to receive electrical light sources, each light source removably mounted at one of the light source mounting locations, the light sources being adapted for connection to a power source;

the acoustical shell enclosing all of the light sources within the recessed area; and, an acoustical blanket mounted on the acoustical shell and installable with the acoustical shell, the acoustical blanket adapted to absorb at least a portion of the second portion of sound energy.

* * * * *